June 1, 1965     I. L. MARRA     3,187,070

PROCESS FOR PRODUCING SEALING MATERIAL

Filed Feb. 21, 1963     2 Sheets-Sheet 1

INVENTOR.
IVAN L. MARRA.
BY John A. Young.
his ATTORNEY

United States Patent Office 3,187,070
Patented June 1, 1965

3,187,070
PROCESS FOR PRODUCING SEALING MATERIAL
Ivan L. Marra, Butler, Pa., assignor to Fre-Mar Industries, Butler, Pa., a corporation of Pennsylvania
Filed Feb. 21, 1963, Ser. No. 260,191
7 Claims. (Cl. 264—171)

This invention relates to a process for producing sealing material for repairing punctures or other faults in pneumatic tires and the like.

It has been the practice, to repair punctures and other sources of leaks in tires, to apply a patch over the tire surface at the source of leakage, generally from the inside of the tire. This practice is unsatisfactory both because it requires demounting the tire and also, once the puncture or rupture reaches a certain size, it is impractical to use a patch-type repair. In attempting to correct this deficiency of "internal" patch-type seals, there has been developed an "external" tire repair technique wherein the repair material is a cord which is laced into the opening and fills the opening with sealing material forming an air-tight plug which fills the opening and grips the edges of the opening in the tire. An example of such material is disclosed in U.S. Patent No. 3,049,164, issued August 14, 1962, titled "Puncture Repair Material." Reference is made to this patent for details of the method whereby the puncture repair material is inserted into the puncture or other fault which causes the leakage.

In a tire repair material of the class described, i.e., an external cord type repair material which is laced into the puncture, the plastic composition which performs the sealing function must be distributed throughout the opening and fill the opening, coming into intimate contact with the edges of the puncture to form a tight grip therewith. Since the plastic material is flowable, the principle is to use a sleeve having a substantial tensile force which serves as a carrier for the plastic material whereby the plastic material can be disposed within the opening filling the opening and sealing it against leakage.

In order to form a tire repair material of the type description, it is necessary to provide a core of the plastic material surrounded by a sleeve which effects a reenforcement for the core. A conventional method of doing this is to extrude the core material and then to knit or weave a sleeve reenforcement over the outer surface of the core. In contrast with this procedure, which is unsatisfactory because it requires a knitting of filaments over the surface of the core and produces a product of variable cross-section, the present invention contemplates an improved method of manufacturing a tire repair material which increases the rate of production of the tire repair material. The improvement is obtained by forming first a sleeve having a substantial tensile strength and constructed of a woven, knitted or suitably oriented plurality of strands or filament which provide sufficient open spaces along the length of the sleeve to permit transition of the tire repair material under pressure, through such open spaces and thereby filling the space surrounded by the sleeve to form a solid core of plastic tire repair material.

In addition, the present invention contemplates the addition of a thin outer lamination of such repair material surrounding the sleeve and which tends to be scraped off as the repair material is laced into the hole or rupture of the tire and comes into intimate contact with the irregular edges of the tire breach, forming both a seal and a bond for maintaining the repair material within the breach and thereby forming a plug against leakage.

Accordingly, one of the principal objects of the present invention is to provide a new and improved method for producing a tire repair material in which the plastic component of the material is extruded within the interior of a previously constructed sleeve to form a core of such plastic tire repair material.

A further object of the present invention is to provide a process for producing a tire repair material in cord form which includes a precisely sized outer diameter and has a uniform cross-section throughout the length of the tire repair material.

A still further object of the present invention is to provide a process for producing a tire repair material having a combination of high tensile strength material which serves as a carrier for a flowable, plastic material which is capable of filling and sealing ruptures and other faults in tires which would otherwise produce leakage.

A still further object of the present invention is to provide a tire repair material, by processing steps in which the plastic material is heat treated to convert the material to a non-tacky condition and in which, while under exposure to heat, does not develop voids or other discontinuities within the core of the material. In this way, the material, being of uniform density, produces a more effective seal when it is inserted within the rupture of the tire.

In a still further object, the present invention provides a sleeve having a characteristically substantial strength in tension which serves as a carrier for a flowable plastic material which fills and seals the opening, and grips the edges forming the puncture of the tire. Such material is suitably reenforced by the filament which can be braided, knitted or otherwise intertwined to serve as a carrier for the plastic material and also to reenforce the repair material in longitudinal stress.

Other objects and features of the present invention will become apparent from a consideration of the following dscription, which proceeds with reference to the accompanying drawings, wherein.

Figure 1:
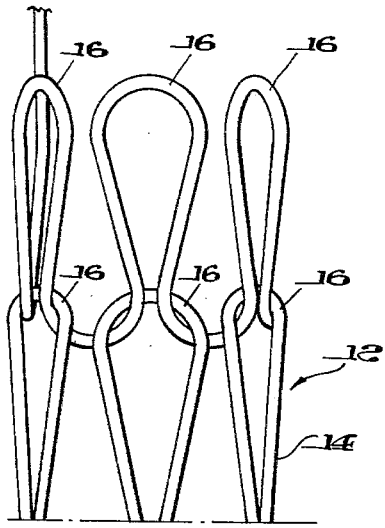
FIGURE 1 is a detail view of the strand or filament which, in the illustration shown, is knitted to form the sleeve portion of the tire repair cord material.
Figure 2:
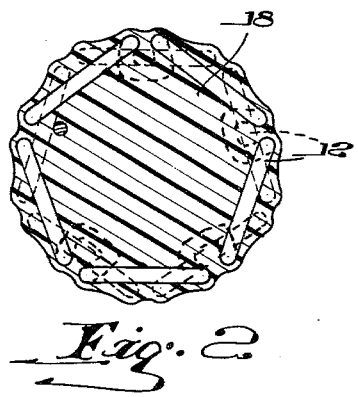
FIG. 2 is a transverse sectional view of FIG. 1 after the sleeve has been filled with the plastic component of tire repair material, this being a cross-sectional view of the finished product having a circular cross-section and of substantial length as compared with the cross-section.

Referring now to the drawings, the tire repair material is manufactured in the form of a continuous length product which resembles a cord, the component parts being comprised of a sleeve 12 which is formed of a filament 14 having a series of continuous interlocking loops, the loops being of wide dimension, as shown in FIG. 1, so that the sleeve is slightly extendable in tension. The sleeve 12 (FIG. 2) surrounds a solid core 18 of plastic sealing material which is flowable under pressure and provides a stable, relatively heat insensitive sealing material which grips the surface of the tire where it requires repair and is impervious to the passage of air through the material. The material may be in the form of a polysulfide composition.

One polysulfide composition which has been found satisfactory for the purposes of the instant invention comprises the polysulfide polymer LP-2 "Thiokol" which is a polymer of bis-(ethylene oxy) methane containing disulfide linkages with terminal Thiol (—SH) groups.

$$HS(C_2H_4—O—CH_2—O—C_2H_4—S—S)_{23}—C_2H_4—O—CH_2—O—C_2H_4—SH$$

Obviously, other suitable polysulfides may be employed if found desirable.

A typical basic polysulfide formulation is as follows:

| | |
|---|---|
| Liquid polysulfide polymer (as above) | 100 |
| Carbon black | 30 |
| Curing agent: | |
| Lead dioxide | 70 |
| Stearic acid | 30 | the mixing ratio being 10 parts of base to one part of curing agent.

The filament used in constructing the sleeve 12, in one preferred embodiment of the invention, is comprised of polypropylene which is found to have the appropriate combination of tensile strength, heat resistance and an inert quality which makes it in combination with polysulfide, a suitable tire sealing material which is heat resistant, can flex, and withstand all of the forces normally encountered by a tire repair material while the tire is in use and exposed to impact force, heat and pressure.

At the same time, the material will be satisfactorily retained in place against deforming forces, blowouts and similar forces. In order to make the product described, the apparatus, designated generally by reference numeral 20 (FIG. 3), is provided with a supply drum 22 having a quantity of the plastic filament which has been formed into a sleeve, either knitted, woven or parallel fibers.

Figure 6:
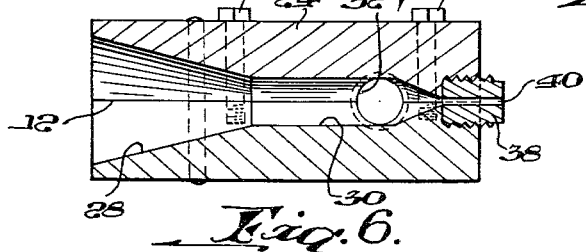
FIG. 6 is an enlarged detail view of the extruding chamber wherein the plastic material is forced through the interstices of the sleeves to provide the cores and outer lamination of the repair material.

The sleeve is fed from the supply drum 22 in continuous length and passed through a pressure chamber 24 (FIGS. 4, 6) which is constructed in two halves, secured together by bolts 26. The interior of the pressure chamber 24 has a conical section 28 which terminates in passage 30 having a supply opening 32 connecting with a conduit 34 from a reservoir 36 which has a charge of the plastic material previously described. The plastic material is flowable under gravity through line 34 into the passage 30. A replaceable threaded plug 38 having a sizing orifice 40 determines the effective outer diameter of the tire repair material as it passes through the orifice 40, and the diameter of the repair material can be varied by removing and replacing the plug 38 with one having the preferred size of orifice 40.

The pressure on the plastic repair material within the passage 30 is sufficient to squeeze such plastic repair material through the interstices of the sleeve 12, (in this case the loops of the sleeve), and the plastic material is compacted within the sleeve space to form a solid core 18 of uniform cross section density. As tthe sleeve-and-core passes through the orifice 40, there is formed a skin coating or lamination of the plastic material over the sleeve 12, the thickness of the lamination being determined by the size of the orifice 40. At this stage, the plastic material is quite tacky and if it comes into contact with any surface, it is likely to be scraped off.

In the next stage of processing, the repair material is drawn upwardly through a vertical enclosure 39 (FIG. 4) having spaced heating elements 41 which control the temperature within the enclosure 39 and the span of material from the point where it leaves the sizing orifice 40 to the pulley 42 (FIG. 4) at the top of the enclosure is about in the order of 40 feet or so. The rate of travel of material through the enclosure together with the heat within the enclosure is such that a sufficient time elapses during the travel of the material through the enclosure such that it partially cures and is not scraped off by the time it reaches the pulley 42. During the interval the plastic material is being cured, i.e., from the time of exit from sizing orifice 40 to the pulley 42, it does not come into contact with any other surface and therefore the lamination at the outer surface of the sleeve remains undisturbed.

Figure 4:
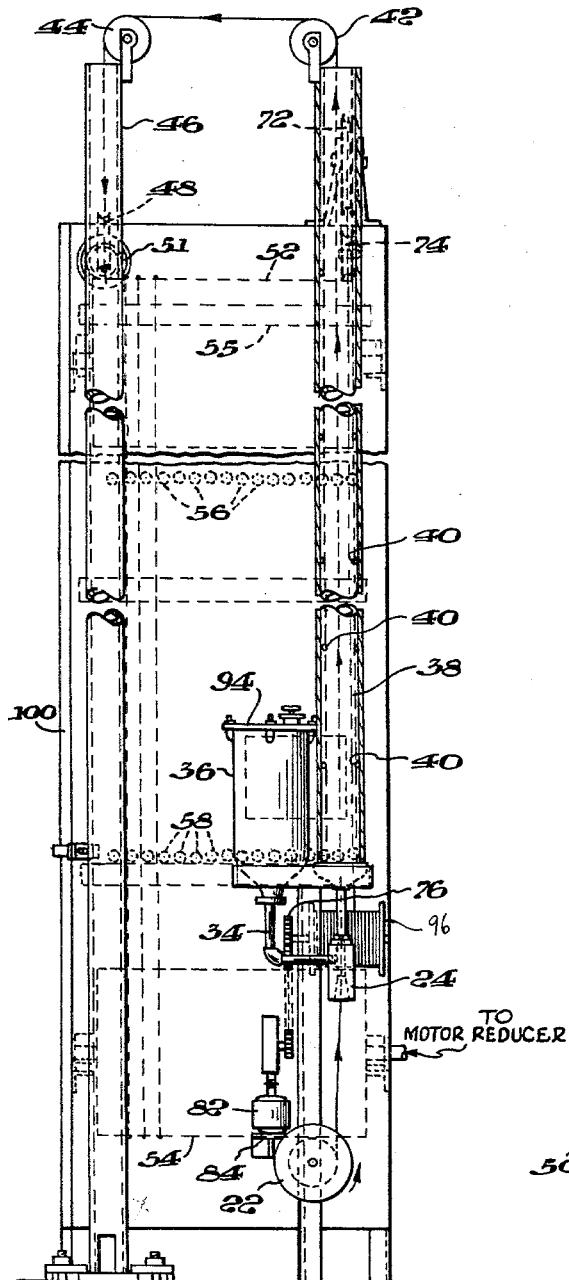
FIG. 4 is a front elevation view of the apparatus looking in the direction of the arrows IV—IV in FIG. 3.

The passage of material upwardly through the enclosure is effected by a drawing action on the repair material, that is, tensile force is communicated to the material in the direction indicated by the line of travel of the material shown by the arrowheads in FIG. 4.

Figure 5:
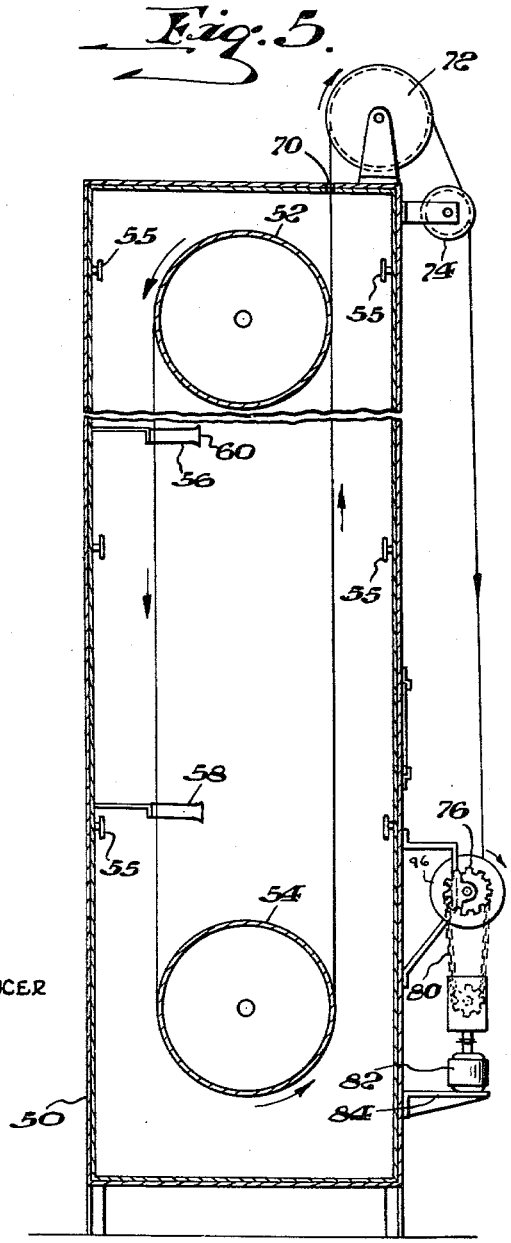
FIG. 5 is a section view taken on line V—V of FIG. 3.

From the pulley 42, the repair material is transferred along a horizontal line of travel to a second pulley 44 where it is passed downwardly through a conduit 46, to the pulley 48 and the material is then passed through conduit 51 (FIG. 3) and into a heating chamber 50 of substantial size in forming a cabinet type heater wherein a plurality of turns of the material are taken over a drum 52 and a drum 54 at the upper and lower ends respectively of the heating chamber 50 (FIGS. 4, 5). Heating chamber 50 includes electrical resistance elements 55 which are controllable to provide uniform heating action within the chamber 50 and also to expose the plastic repair material to whatever temperature is required for a gradual polymerization thereof. The purpose of effecting polymerization over a controlled period of time, for a typical temperature of 140° F. and for a 45 minute period of time is that there will be no gasification within the interior of the core 18 to produce vacuum openings therein. Therefore, the density of the plastic material is substantially uniform throughout the length of the repair material.

As the cord repair material 12 passes first over one drum 52 and then to the other drum 54, the respective passes are separated by spacers 56 and 58, the row of spacers 56, and 58 having sufficient spacings therebetween to provide for vertical movement of the cord 12 but preventing their overlap. The spacers 56 have bellmouthed ends 60 to prevent whipping of the cord repair material back and forth as it moves vertically. After having traversed through about fifteen or so passes within the chamber 50 over the two drums 52 and 54, it has been exposed to the temperature for a sufficient period of time to be adequately polymerized and at the last pass, the cord material passes through outlet opening 70 (FIG. 5) is passed over pulley 72 and pulley 74 and is wound onto the windup reel 76 which is driven by a friction clutch 78 actuated through a chain drive 80 from a motor 82 supported on bracket 84.

The clutch 78 insures a substantially uniform tensile force on the repair material as it is drawn first from the supply drum 22 and then successively through the die 24, enclosure 39 and chamber 50 (FIG. 4). The entire time of travel from start to finish is about 45 minutes. The apparatus as described, can run continuously and is capable of producing repair material of different sizes and compositions by merely changing the size of the plug 38 to provide whatever orifice 40 diameter is selected.

The process described can produce product at the rate of about 25 feet per minute, the temperature in all portions of the device being controlled from a control panel 90 having control dials 92 available to the operator for controlling the speed, temperature and tension on the material.

In operation, the chamber 36 is charged with plastic material through opening 94, the electrical resistance elements 41 in enclosure 39 and elements 55 in chamber 50 (FIGS. 4, 5) are heated to provide the preferred temperature which controls the rate of polymerization of the plastic material in the repair cord which is suitably strung from the drum 22 through enclosure 39, the pulleys 42, 44 and 48 to the drums 52 and 54 where they are passed upwardly and downwardly for a preferred number of passes thereby exposing the material for the requisite time to polymerization temperature.

The finished product is then withdrawn through outlet opening 70 over the pulley 72 and 74 and onto the windup reels 76 and is then wound onto the takeup reel 96 under substantially constant tension by the motor 82. The heating chamber 50 has a door 100, FIG. 3, which provides access to the interior of the chamber during the stringing of the product which occurs as part of the setup.

Figure 3:
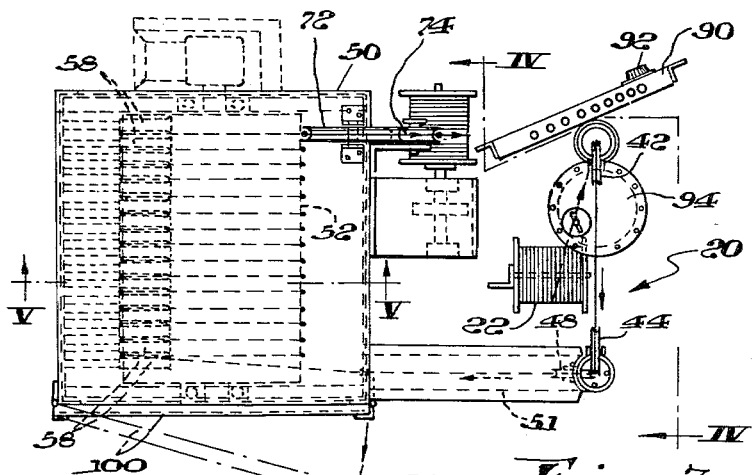
FIG. 3 is a top view of the apparatus for producing the material, looking down from the uppermost portion of the apparatus.

There is available to the operator, by means of the controls 92, FIG. 3, a convenient means for controlling the product by suitable variation of temperature, speed of windup and therefore exposure time to temperature whereby polymerization rate, final tackiness, etc., of the product can be, at all times, regulated.

The temperature values in the vertical enclosure 39 and chamber 50 vary according to the speed of producing the product and the humidity. Typical of suitable temperatures in enclosure 39 is about 100°–170° F., and chamber 50 is typically about 160° F. where the product is about 3/8 inch diameter and the running speed of the product is about 25 feet per minute.

While the invention has been illustrated and described in connection with a single example embodiment, it will be understood that this is illustrative of the invention and is by no means restrictive thereof. It is reasonable to be expected that those skilled in the art can make numerous revisions and adaptations of the invention to suit individual design requirements and it is intended that such revisions and changes which incorporate the herein-disclosed principles, will be included within the scope of the following claims as equivalents of the invention.

I claim:

1. A process for producing puncture repair materials of the cord-type, outside-in construction, comprising: forming a continuous interwoven sleeve with internal spacings and peripheral openings recurring along the length of the sleeve throughout its length, said sleeve being of substantial tensile strength and flexible composition to be adaptable for bending back and forth upon itself; imposing external pressure upon a curable plastic flowable material while said sleeve is passed through a mass of such plastic flowable material contained within a chamber to translate such plastic material under pressure through the peripheral openings of said sleeve to fill substantially all of the voids internally of the sleeve and thereby form a solid core of tire sealant which is permanently malleable and substantially inert to the surrounding sleeve acting as a flexible, non-flowable phase carrier for the plastically flowable phase core sealant; and drawing the combination of core and sleeve through a sizing orifice which is of greater diameter than said sleeve to produce a continuous lamination of such plastic material over the outer surface of the sleeve throughout the length of the cord material.

2. The process in accordance with claim 1 wherein said charge of flowable plastic material is squeezed under sufficient pressure through the peripheral openings of the sleeve to form a compact solid core of substantially uniform density throughout the length of the cord.

3. A process for producing a repair material of the cord-type, outside-in construction comprising: forming a continuous interwoven sleeve with internal voids along the length of the sleeve and of substantial tensile strength and flexible composition material adapted for bending back upon itself; immersing the sleeve within a charge of plastic flowable polysulfide base material which is translated under pressure through peripheral spacings of the sleeve to fill the voids along the length of said sleeve and thereby become a continuous phase core of tire sealant which is permanently malleable and substantially inert to the surrounding sleeve which is completely filled and serves as a flexible phase carrier for the plastically flowable core of sealant; drawing the combination of solid core and surrounding sleeve through a sizing orifice which is of greater diameter than said sleeve to form a lamination of such plastic material over the outer surface of said sleeve throughout the length of the cord material; and then passing the laminated core and sleeve through a heating chamber which converts the plastic to a partially cured state at a rate which is unproductive of voids or discontinuities within said core.

4. The process in accordance with claim 3 wherein the cord is treated in continuous length and of substantial span during heat treatment to be disengaged from potential abrasions during such heat treatment.

5. A process for producing cord type outside-in repair material comprising the steps of: drawing through a chamber a continuous length woven sleeve having spacings at intervals along the length of the sleeve and internal voids also along the length of the sleeve; supplying a plastic phase permanently malleable polysulfide base sealant to the chamber where it is then subjected to pressure sufficient to translate said polysulfide into the interior of the sleeve to form a compact central core of malleable construction and uniform density and having the properties of doubling upon itself; and then drawing the core-and-sleeve through a sizing orifice which is proportioned relatively to the sleeve to form a surrounding lamination over the sleeve throughout its length.

6. The process in accordance with claim 5 wherein said plastic is comprised of polysulfide base plastic material and the sleeve is a woven monofilament of plastic composition.

7. The process in accordance with claim 6 wherein the sleeve is comprised of a woven polypropylene monofilament.

References Cited by the Examiner

UNITED STATES PATENTS 3,049,164   8/62   Humphreys et al. _____ 153—370

OTHER REFERENCES

Burton, Walter: The Story of Tire Beads and Tires, N.Y., McGraw-Hill, 1954, pages 74, 79, 80, 92, 93, 115, and 186, TL270B8.

EARL M. BERGERT, *Primary Examiner.*